United States Patent [19]

Korzenecki

[11] Patent Number: 4,883,164

[45] Date of Patent: Nov. 28, 1989

[54] VACUUM OPERATED TRANSFER MACHINE

[75] Inventor: Paul Korzenecki, Benton Harbor, Mich.

[73] Assignee: Mac Engineering & Equipment Company, Inc., Benton Harbor, Mich.

[21] Appl. No.: 203,883

[22] Filed: Jun. 8, 1988

[51] Int. Cl.[4] .............................................. B65G 37/00
[52] U.S. Cl. .................................. 198/468.4; 414/752
[58] Field of Search ................. 198/468.4, 466.1, 416, 198/461; 414/330, 752; 29/730

[56] References Cited

U.S. PATENT DOCUMENTS

| | | |
|---|---|---|
| 2,626,038 | 1/1953 | Smith . |
| 2,704,593 | 3/1955 | Galloway . |
| 3,510,931 | 5/1970 | Harris . |
| 3,741,365 | 6/1973 | McAlpine et al. . |
| 3,799,322 | 3/1974 | Van Linder et al. ........ 198/466.1 X |
| 3,910,424 | 10/1975 | Kawahara ..................... 198/416 X |
| 3,982,624 | 9/1976 | Eberle . |
| 4,069,925 | 1/1978 | Ahokas et al. ............... 198/465.4 X |
| 4,168,772 | 9/1979 | Eberle . |
| 4,196,511 | 4/1980 | Kolosov . |
| 4,349,959 | 9/1982 | Urban . |
| 4,455,724 | 6/1984 | Sperling et al. ............. 198/466.1 X |

FOREIGN PATENT DOCUMENTS 74818 4/1987 Japan ................................ 198/468.4
319009 1/1972 U.S.S.R. .............................. 29/730
632016 11/1978 U.S.S.R. .............................. 29/730

Primary Examiner—Robert J. Spar
Assistant Examiner—Cheryl L. Gastineau
Attorney, Agent, or Firm—Michael, Best & Friedrich

[57] ABSTRACT

Disclosed herein is apparatus for transporting battery plate grids which include a lug and which are transported from a magazine, which apparatus comprises a rail supporting a grid lug for movement of the grid lug along the rail from a pick-up station adjacent the magazine, through a transfer station, and to a delivery station, structure for supporting a suction cup for movement parallel to the rail and from a first position wherein the suction cup engages the grid lug at the pick-up station to a second position spaced from the first position and wherein the grid lug is located at the transfer station, for movement transversely to the rail from the second position to a third position, and thereafter for movement to the first position, a stripping member for stripping the grid lug from the suction cup in response to movement of the suction cup from the second position to the third position, and a valve connected to the suction cup for applying suction at the suction cup during movement of the suction cup from the first position to the second position so as thereby to transport the grid in common with movement of the suction cup from the pick-up station to the transfer station.

21 Claims, 3 Drawing Sheets

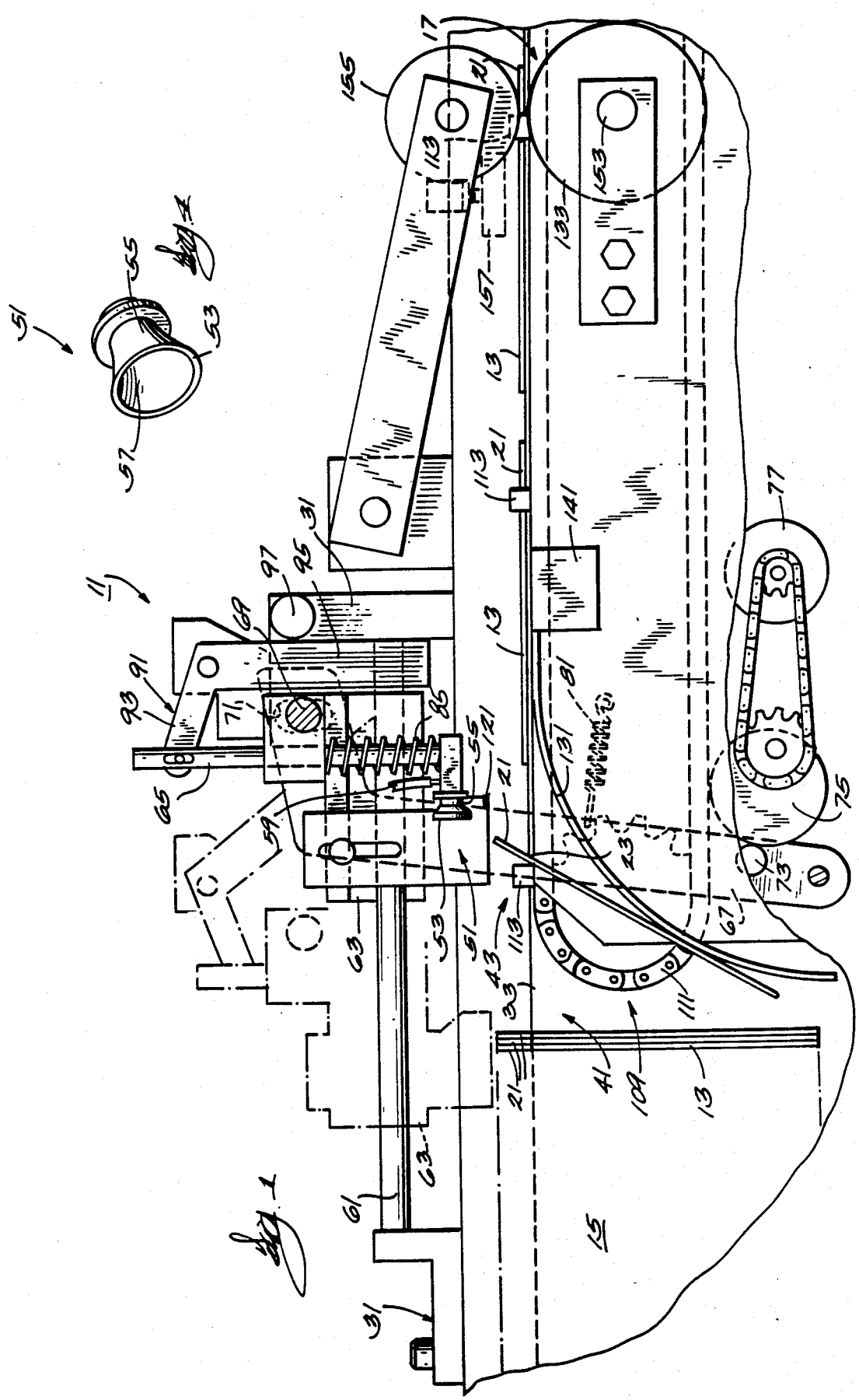

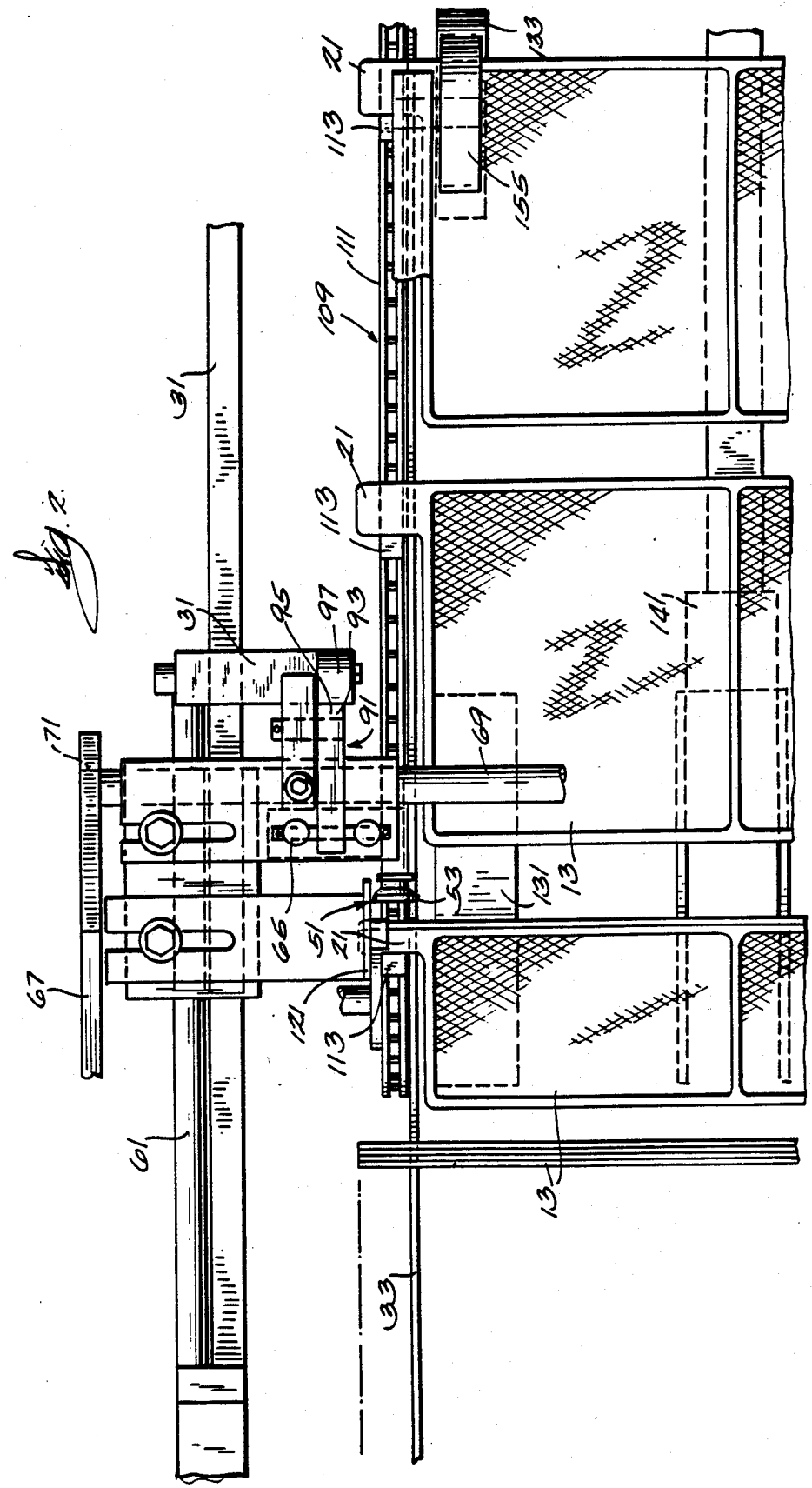

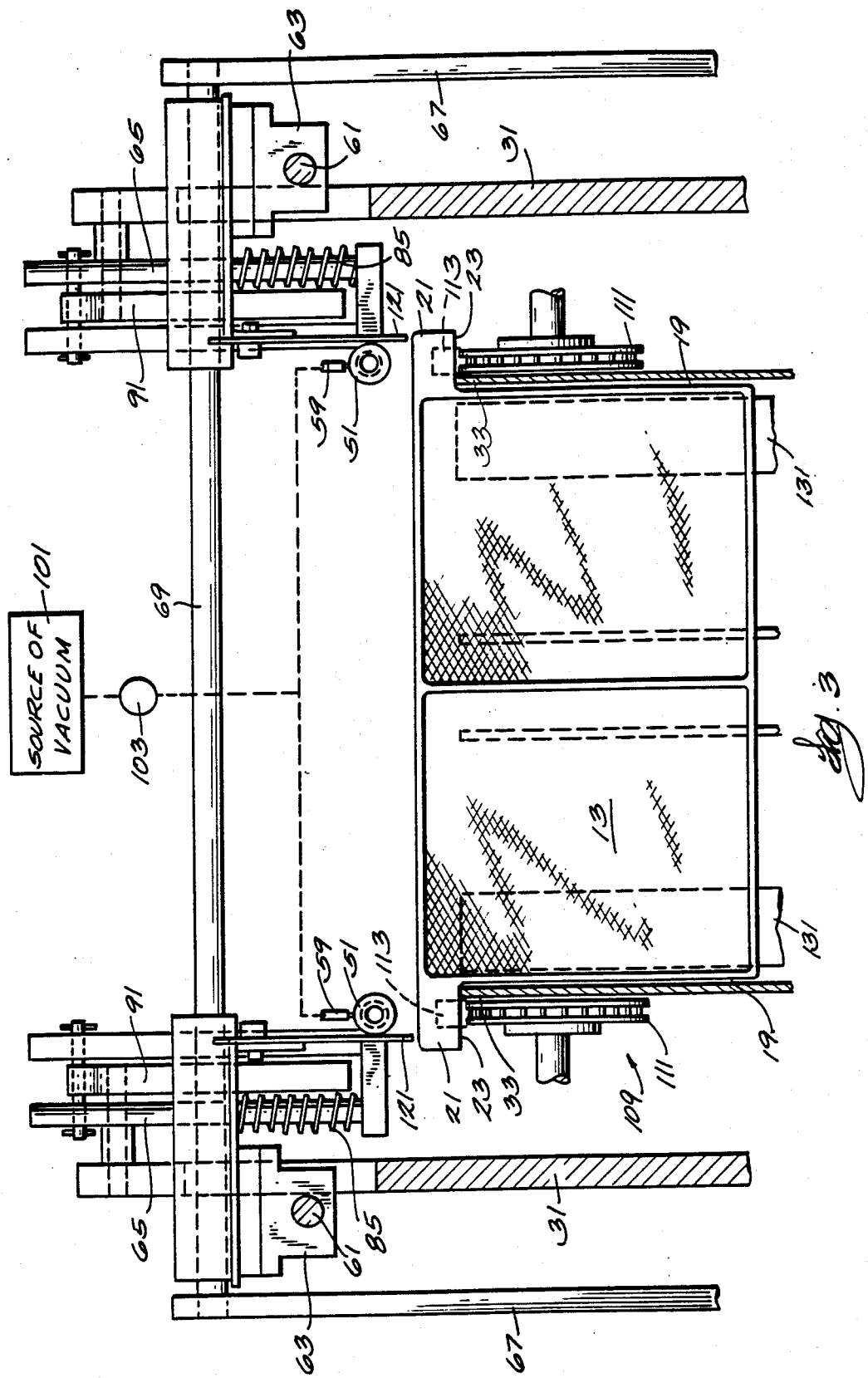

VACUUM OPERATED TRANSFER MACHINE

BACKGROUND OF THE INVENTION

The invention relates generally to machines for transporting battery plate grids from a magazine to a delivery station at which the battery plate grids are delivered to another machine for performing a subsequent operation.

The invention also relates to such transfer machines for transferring battery plate grids which are vertically oriented in the magazine and which are delivered to the next machine in a horizontal orientation.

In one prior construction, such transfer machines included a pair of horizontally spaced support rails which were adapted to engage and support the oppositely extending lugs of the battery plate grids and which included a vertical step in horizontally spaced relation to the magazine. The battery plate grids were transported from the magazine by and along an upper portion of the rails upstream of the vertical step and for a distance downstream of the vertical step by a suction mechanism including one or more suction cups. The suction mechanism traveled in a straight line extending from ahead of to beyond the vertical step. When beyond the vertical step, the grids were solely supported by the suction mechanism at a location above the lower portions of the rails.

In addition, such transfer machines also included stops located in the path of battery plate grid travel downstream from the vertical step and operative, in response to horizontal downstream movement of the suction mechanism, to strip the battery plate grids from the suction cups. Such stripped grids fell by gravity to the underlying segment of the lower portion of the rails, and were thereafter supported by the lower portion of the rails for transport further downstream and under the path of suction cup travel by a conveyor which engaged the lugs supported on the rails. During such downstream movement, the grids were re-oriented from the vertical orientation to a horizontal orientation by reason of engagement with a curved member located in the path of grid travel.

Attention is directed to the following U.S. Pat. Nos:

| | | |
|---|---|---|
| 2,626,038 | W. W. Smith | January 20, 1953 |
| 2,704,593 | C. D. Galloway | March 22, 1955 |
| 3,510,931 | J. D. Harris | May 12, 1970 |
| 3,741,365 | McAlpine, et al. | June 26, 1973 |
| 3,982,624 | W. J. Eberle | September 28, 1976 |
| 4,168,772 | W. J. Eberle | September 25, 1979 |
| 4,196,511 | I. A. Kolosov | April 8, 1980 |
| 4,349,959 | T. A. Urban | September 21, 1982 |

SUMMARY OF THE INVENTION

The invention provides apparatus for transporting battery plate grids which include a lug and which are transported from a magazine for delivery from the apparatus, which apparatus comprises a frame including a rail supporting a grid lug for movement of the grid lug along the rail from a pick-up station adjacent the magazine, through and to a second station, a suction cup, means on the frame for supporting the suction cup for movement of the suction cup parallel to the rail and from a first position wherein the suction cup engages the grid lug at the pick-up station and to a second position spaced from the first position and wherein the grid lug is located at the second station, for movement of the suction cup transversely to the rail from the second position to a third position, and thereafter for return movement of the suction cup to the first position, and means connected to the suction cup for applying suction at the suction cup during movement of the suction cup from the first position to the second position so as to retain the grid lug in engaged relation with the suction cup and so as thereby to transport the grid in common with movement of the suction cup from the pick-up station to the transfer station.

The invention also provides apparatus for transporting battery plate grids which include a lug, which are transported from a vertical orientation in a magazine, and which are pivoted to a horizontal orientation for delivery from the apparatus, which apparatus comprises a frame including a rail supporting a grid lug for movement of the grid lug along the rail from a pick-up station adjacent the magazine, through a transfer station, and to a delivery station, a suction cup, means on the frame for supporting the suction cup for movement of the suction cup parallel to the rail and from a first position wherein the suction cup engages the grid lug at the pick-up station to a second position spaced from the first position and wherein the grid lug is located at the transfer station, for movement of the suction cup transversely to the rail from the second position to a third position, and thereafter for return movement of the suction cup to the first position, means engageable with the grid lug for stripping the grid lug from the suction cup in response to movement of the suction cup from the second position to the third position, means connected to the suction cup for applying suction at the suction cup during movement of the suction cup from the first position to the second position so as to retain the grid lug in engaged relation with the suction cup and so as thereby to transport the grid in common with movement of the suction cup from the pick-up station to the transfer station, conveyor means on the frame for engaging the grid lug at the transfer station and for transporting the grid along the rail to the delivery station, and means on the frame for engaging the grid during movement thereof along the rail from the pick-up station to the delivery station so as to cause pivotal movement of the grid from the vertical orientation to the horizontal orientation.

The invention also provides apparatus for transporting battery plate grids which include a pair of spaced lugs, which are transported from a vertical orientation in a magazine, and which are pivoted to a horizontal orientation for delivery from the apparatus, which apparatus comprises a frame including a pair of laterally spaced flat rails for respectively supporting the spaced grid lugs for movement of the grid lugs along the rails from a pick-up station adjacent the magazine, through a transfer station, and to a delivery station, a pair of suction cups, means on the frame for supporting the suction cups for movement of the suction cups parallel to the rails and from a first position wherein the suction cups engage the grid lugs at the pick-up station to a second position spaced from the first position and wherein the grid lugs are located at the transfer station, for movement of the suction cups transversely to the rails from the second position to a third position, and thereafter for return movement of the suction cups to the first position, means engageable with the grid lugs for stripping the grid lugs from the suction cups in response to movement of the suction cups from the second position to the third position, means connected to the suction cups for applying suction at the suction cups during movement of the suction cups from the first position to the second position so as to retain the grid lugs in engaged relation with the suction cups and so as thereby to transport the grids in common with movement of the suction cups from the pick-up station to the transfer station, conveyor means on the frame for engaging the grid lugs at the transfer station and for transporting the grids along the rails to the delivery station, and means on the frame for engaging the grids during movement thereof along the rails from the pick-up station to the delivery station so as to cause pivotal movement of the grids from the vertical orientation to the horizontal orientation.

Other features and advantages of the invention will become known by reference to the following drawings, general description, and claims.

THE DRAWINGS

FIG. 1 is a partial side elevational view of a battery plate grid transfer machine which embodies various of the features of the invention.

FIG. 2 is a partial top view of the machine shown in FIG. 1.

FIG. 3 is a partially schematic end view of the machine shown in FIGS. 1 and 2.

FIG. 4 is an enlarged and partially broken away perspective view of one of the suction cups included in the machine shown in FIGS. 1, 2, and 3.

Before one embodiment of the invention is explained in detail, it is to be understood that the invention is not limited to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

GENERAL DESCRIPTION

Shown in the drawings is apparatus 11 for delivering battery plate grids 13 from a magazine 15 in which the battery plate grids 13 are vertically oriented to a delivery station 17 wherein the battery plate grids 13 are horizontally oriented. As is common, the battery plate grids 13, as shown in FIGS. 2 and 3, are generally rectangular, and include, along each of the grid side edges 19, a laterally extending lug 21 having a flat surface with an edge 23. The grids 13 can be either of cast construction or of expanded material.

The apparatus 11 includes a frame 31 which can be suitably constructed and which includes a pair of flat or straight rails 33 which extend into the magazine 15, and which are laterally spaced at a distance slightly greater than the spacing between the side edges 19 of the battery plate grids 13 so as to enable support of the battery plate grids 13 in vertical orientation by reason of engagement of the of the lugs 21 with the rails 33.

In this regard, the rails 33 extend into the magazine 15, wherein the battery plate grids 13 are supported in closely spaced relation to each other, through a pick-up station 41 associated with the magazine 15, through a transfer station 43, and to the delivery station 17.

The battery plate grids are individually removed from the magazine 15 and are transported along the rails 33 to the transfer station 43 by a pair of suction cups 51 which engage and releasably grip the lugs 21 so as to enable transfer or conveyance of the battery plate grids 13 from the pick-up station 41 at the magazine 15 to the transfer station 43. The suction cups 51 are generally identically constructed and each is fabricated of a flexible material, such as rubber or other rubber-like material, to include a horn shaped portion 53 which is engageable with one of the lugs 21, a central necked portion 55, and a central bore 57 which, at one end, communicates with the horn shaped portion 53 and which, at the other end, is adapted to be connected with a flexible hose 59 through which suction can be applied at the horn shaped portion 53. Other specific constructions can also be employed.

Means are provided for supporting and moving or displacing the suction cups 51 along a path which extends parallel to the rails 33 and then transversely away from the rails 33. While various other arrangements can be employed for supporting and displacing the suction cups 51 along the path, in the disclosed construction, such means comprises, for each of the suction cups 33, respective support rods 61 fixed on the frame 31 in parallel spaced relation to the top edge or surface of the respective rails 33, the support rods 61 being located laterally outwardly and above the associated rails 33.

Movably mounted on the support rods 61 are respective support blocks 63 which can be constructed in any suitable way. Carried by the support blocks 63 are respective support members 65 which are movable in common with the support blocks 63 and along a path extending transversely to the support rods 61, i.e., in the specifically disclosed construction, along a path perpendicular to the support rods 61 and between a lower extended position and a raised retracted position. At their lower ends, the support members 65 have respectively fixed thereto the suction cups 51.

When the support members 65 are in their lower or extended positions, the suction cups 51 are horizontally aligned for engagement with the lugs 21 on the battery plate grids 13 in the magazine 15.

The suction cup supporting and moving means also includes means for displacing the respective support blocks 63 back and forth on the support rods 61 to move the suction cups 51 along a path parallel to and transverse to the support rails 33. While various arrangements can be employed, such as by hydraulic or mechanical circuitry, in the disclosed construction, the support blocks 63 are reciprocated back and forth along the support rods 61 by mechanical means including a pair of lever arms 67 which are pivotally mounted on the frame 31 about a common axis for oscillation in common. In this regard, the support blocks 63 are connected for common movement by a transverse rod or beam 69 which extends through the support blocks 63 and, at the outer ends thereof, through respective slots 71 provided in the lever arms 67 and extending radially with respect to the lever arm axis so that oscillation of the lever arms 67 causes reciprocal movement of the support blocks 63.

Means are provided for oscillating the lever arms 67. While various arrangements can be employed, in the disclosed construction, such means comprises, at the lower end of at least one of the lever arms 67, a cam follower 73 engaged with a cam 75 mounted for rotation on the frame 31 and drivingly rotated by a suitable electric motor 77. Any suitable cam profile can be employed. A tension spring 81 anchored between the frame 31 and the lower end of one of the lever arms 67 maintains engagement of the follower 73 with the cam 75.

The suction cup supporting and moving means also comprises means for displacing the suction cups 51 upwardly and away from, and downwardly and toward, the support rails 33 in response to movement of the support blocks 63 along the support rods 61 and thereby to permit passage thereunder of the lugs 21 of the battery plate grids 13.

While various other arrangements can be employed, in the disclosed construction, the support members 65 are biased to the lower or extended positions by respective springs 85 which surround the support members 65 and which, at their upper ends, engage the undersurface of the support blocks 63 and which, at their lower ends, bear against a suitable surface on the support members 65. In addition, the means for vertically moving the support members 65 includes cam and follower means. More specifically, each of the support blocks 63 has pivotally mounted thereon a bell crank lever 91 having an arm 93 operably connected to the associated support member 65 so that bell crank lever movement in the clockwise direction, as shown in FIG. 1, against the action of the springs 85, causes upward movement of the support members 65 and supported suction cups 51 away from the lower or extended position. The bell crank levers 91 also respectively include second arms 95 which extends for engagement with respective cam rods 97 fixedly mounted on the frame 31 in position so that movement of the support blocks 63 to the right in FIG. 1 causes engagement of the bell crank lever second arms 95 with the cam rods 97 to effect rotation of the bell crank levers 91 in the clockwise direction, causing movement of the support members 65 from the lower extended positions to the upper retracted positions (against the action of the springs 85) and in response to movement of the support blocks 65 to the right in FIG. 1. In the disclosed construction, the cam rods 97 are located to initiate upward movement of the support members 65 as the suctions cups 51 move to the right through the transfer station 43.

Means are provided for applying vacuum to the suction cups 51 when the suction cups 51 are engaged with the lugs 21 of the last grid in the magazine 15 and for discontinuing suction at the suction cups 51 after the movement of the suction cups 51 has caused conveyance or delivery of the grids 13 from the magazine 15 to the transfer station 43. While various other arrangements can be employed, in the disclosed construction, such means comprises the before mentioned flexible suction lines or hoses 59 connected to the suction cups 51, a suitable source 101 of suction, and suitable valving 103 between the suction source 101 and the flexible suction hoses or lines 59. Such arrangements are believed to be well known in the art and need not be further described. In practice, the valves 103 are operated to effect the presence of suction at the suction cups 51 when the suction cups 51 are engaged with the lugs 21 of the endmost grid 13 in the magazine 15 and to discontinue the suction when the suction cups 51 move through the transfer station 43.

Means are provided for engaging the lugs 21 and for transporting the grids 13 along the rails 33 from the transfer station 43 to the delivery station 17 after discontinuance of the suction and disengagement of the suction cups 51 from the lugs 21. While other constructions can be employed, in the disclosed construction, such means comprises a conveyor 109 including a pair of commonly driven endless chains 111 or the like, which chains 111 respectively include thereon a series of drive lugs 113 which are located in spaced laterally aligned relation and in spaced lengthwise relation along the chains 111 and which are engageable with the grid lugs 21 to push the grids 13 along the rails 33 to the delivery station 17. In this regard, the conveyor 109 is arranged to provide a run between the transfer station 43 and the delivery station 17. Any suitable means can be employed to drive the conveyor 109. Preferably, the conveyor 109 is driven in synchronization with the oscillating lever arms 67 by the same electric motor 77 through any suitable drive arrangement.

Means are provided for assuring disengagement of the suction cups 51 from the grid lugs 21 after discontinuance of suction at the suction cups 51 and in response to upward movement of the support members 65 and connected suction cups 51. While various other suitable constructions can be employed, in the illustrated construction, such means comprises stripper members 121 adjustable fixed on each of the support blocks 65 in position to interfere with upward travel of the grid lugs 21 away from the support rails 33. As a consequence, the grid lugs 21 are stripped from the suction cups 51 by the stripper members 121 in response to attempted upward movement of the grid lugs 21 away from the rails 33. Thus, the simultaneous discontinuation of suction, coupled with simultaneous upwardly movement of the support members 67 and the suction cups 51 carried thereby, and the simultaneous disengagement of the suction cups 51 from the grid lugs 21 by the stripper members 121, facilitate retention of the grid lugs 21 on the support rails 33 in position for driving engagement of the grid lugs 21 by the conveyor drive lugs 113 so as to transport the battery plate grids 13 from the transfer station 43 to the delivery station 17.

Means are also provided for pivoting the grids 13 from the vertical orientation at the magazine 15 to a horizontal orientation as the grids 13 are transported from the magazine 15 to the delivery station 17. While other constructions can be employed, in the disclosed construction, such means comprises a curved cam surface 131 which is engaged by the main body of the grids 13 during transport and which upwardly lifts the lower edge of the grids 13 until the grids are horizontal before arriving at the delivery station 17.

Means are also provided for preventing continued operation of the conveyor 109 in the absence of a continuous flow of grids 21 to the transfer station 43. While other constructions can be employed, in the disclosed construction, a schematically illustrated proximity switch 141 is located in position underneath the horizontal run of the conveyor 109 in position to sense the absence of a horizontally oriented grid 13. In the absence of a grid 13 for each laterally aligned pair of drive lugs 113 on the conveyor 109, the proximity switch 141 operates to discontinue energization of the electric drive motor 77.

Means are also provided for preventing multiple grid feed to the delivery station 17. While other constructions can be employed, in the disclosed construction such means comprises, adjacent the delivery station 47, an anvil roller 133 supported beneath the flow of horizontally oriented grids 13 on a fixed axis 153 and in position to rollingly engage the under surface of each passing grid 13. In addition, such means also includes a gauge roller 155 located above the path of the horizontally moving grids 13 and biased by a light force provided by suitable means into engagement with the top surface of the moving grids 13. The gauge roller is 155 mounted for movement in such a manner so that if more than one grid 13 at a time passes between the anvil roller 151 and the gauge roller 155, the gauge roller 155 will be displaced against the action of the bias to a position which is effective to actuate a schematically illustrated switch 157 to discontinue driving operation of the electric drive motor 77. As a consequence, operation of the apparatus 11 is arranged to be discontinued if each pair of laterally aligned drive lugs 113 is not provided with a single battery grid, 13 i.e., if more than one battery grid 13 passes between the anvil roller 151 and the gauge roller 155.

Various of the features of the invention are set forth in the following claims.

I claim:

1. Apparatus for transporting battery plate grids which include a lug, and which are transported from a magazine for delivery from said apparatus, said apparatus comprising a frame including a rail supporting a grid lug for movement of the grid lug along said rail from a pick-up station adjacent the magazine, through and to a second station spaced from said pick-up station, a suction cup, means on said frame for supporting said suction cup for movement of said suction cup parallel to said rail and from a first position wherein said suction cup engages the grid lug at said pick-up station and to a second position spaced from said first position, for movement of said suction cup transversely to said rail from said second position to a third position, and thereafter for return movement of said suction cup to said first position, and means connected to said suction cup for applying suction at said suction cup during movement of said suction cup from said first position to said second position so as to retain the grid lug in engaged relation with said suction cup and so as thereby to transport the grid along said rail in common with movement of said suction cup from said pick-up station to said second station.

2. Apparatus for transporting battery plate grids which include a lug, and which are transported from a magazine for delivery from said apparatus, said apparatus comprising a frame including a rail supporting a grid lug for movement of the grid lug along said rail from a pick-up station adjacent the magazine, through and to a second station, a suction cup, means on said frame for supporting said suction cup for movement of said suction cup parallel to said rail and from a first position wherein said suction cup engages the grid lug at said pick-up station and to a second position spaced from said first position, for movement of said suction cup transversely to said rail from said second position to a third position, and thereafter for return movement of said suction cup to said first position, means connected to said suction cup for applying suction at said suction cup during movement of said suction cup from said first position to said second position so as to retain the grid lug in engaged relation with said suction cup and so as thereby to transport the grid along said rail in common with movement of said suction cup from said pick-up station to said second station, and means engageable with the grid lug for stripping the grid lug from said suction cup in response to movement of said suction cup from said second position to said third position.

3. Apparatus for transporting battery plate grids which include a lug, and which are transported from a magazine for delivery from said apparatus, said apparatus comprising a frame including a rail supporting a grid lug for movement of the grid lug along said rail from a pick-up station adjacent the magazine, through and to a second station, and from said second station to a delivery station, a suction cup, means on said frame for supporting said suction cup for movement of said suction cup parallel to said rail and from a first position wherein said suction cup engages the grid lug at said pick-up station and to a second position spaced from said first position, for movement of said suction cup transversely to said rail from said second position to a third position, and thereafter for return movement of said suction cup to said first position, means connected to said suction cup for applying suction at said suction cup during movement of said suction cup from said first position to said second position so as to retain the grid lug in engaged relation with said suction cup and so as thereby to transport the grid along said rail in common with movement of said suction cup from said pick-up station to said second station, and conveyor means on said frame for engaging the grid lug at said second station and for transporting the grid along said rail to said delivery station.

4. Apparatus in accordance with claim 3 wherein the grids are in a vertical orientation in the magazine and further including means on said frame for engaging the grids during movement thereof along said rail from said pick-up station to said delivery station so as to cause pivotal movement of the grids from the vertical orientation to the horizontal orientation.

5. Apparatus for transporting battery plate grids which include a lug, and which are transported from a magazine for delivery from said apparatus, said apparatus comprising a frame including a rail supporting a grid lug for movement of the grid lug along said rail from a pick-up station adjacent the magazine, through and to a second station, a suction cup, means on said frame for supporting said suction cup for movement of said suction cup parallel to said rail and from a first position wherein said suction cup engages the grid lug at said pick-up station and to a second position spaced from said first position, for movement of said suction cup transversely to said rail from said second position to a third position, and thereafter for return movement of said suction cup to said first position, said suction cup supporting means comprising a support rod extending in parallel relation to said rail, a support block movable along said rod, means for reciprocating said support block along said rod, a member supporting said suction cup and carried by said support block for movement in common with said support block and for movement transversely of said support rod, and means for displacing said support member transversely of said support rod in response to movement of said support block beyond said second position, and means connected to said suction cup for applying suction at said suction cup during movement of said suction cup from said first position to said second position so as to retain the grid lug in engaged relation with said suction cup and so as thereby to transport the grid along said rail in common with movement of said suction cup from said pick-up station to said second station.

6. Apparatus in accordance with claim 5 wherein said means for reciprocating said support block comprises a lever pivotally mounted on said frame about an axis extending transversely of said rail, means for oscillating said lever, and means connecting said lever and said support block for displacing said support block along said support rod in response to oscillation of said lever.

7. Apparatus in accordance with claim 5 wherein said means for displacing said support member includes means biasing said support member for travel toward said rail, and means for displacing said support member away from said rail and against the action of said biasing means in response to movement of said support block on said support rod.

8. Apparatus in accordance with claim 7 wherein said means displacing said support member away from said rail comprises a stationary cam surface on said frame, a bell crank lever pivotally mounted on said support block for movement in common therewith and including a first arm engagable with said cam surface in response to support block movement, and a second arm, and means operatively connecting said second arm and said support member for displacing said support member away from said rail in response to pivotal movement of said bell crank lever incident to engagement between said cam surface and said first arm during movement of said support block along said support rod.

9. Apparatus in accordance with claim 1 and further including drive means operable to displace said suction cup, and means for discontinuing driving operation of said drive means in the event more than a single grid is transported at one time by said apparatus.

10. Apparatus in accordance with claim 3 wherein said conveyor means includes a pair of laterally spaced endless members, each endless member including a series of lugs in laterally aligned relation, and means for discontinuing driving operation of said drive means in the absence of a grid transported by each pair of laterally aligned drive lugs on said conveyor means.

11. Apparatus for transporting battery plate grids which include a lug, which are transported from a vertical orientation in a magazine, and which are pivoted to a horizontal orientation for delivery from said apparatus, said apparatus comprising a frame including a rail supporting a grid lug for movement of the grid lug along said rail from a pick-up station adjacent the magazine, through a transfer station, and to a delivery station, a suction cup, means on said frame for supporting said suction cup for movement of said suction cup parallel to said rail and from a first position wherein said suction cup engages the grid lug at said pick-up station to a second position spaced from said first position and wherein the grid lug is located at said transfer station, for movement of said suction cup transversely to said rail from said second position to a third position, and thereafter for return movement of said suction cup to said first position, means engageable with the grid lug for stripping the grid lug from said suction cup in response to movement of said suction cup from said second position to said third position, means connected to said suction cup for applying suction at said suction cup during movement of said suction cup from said first position to said second position so as to retain the grid lug in engaged relation with said suction cup and so as thereby to transport the grid in common with movement of said suction cup from said pick-up station to said transfer station, conveyor means on said frame for engaging the grid lug at said transfer station and for transporting the grid along said rail to said delivery station, and means on said frame for engaging the grid during movement thereof along said rail from said pick-up station to said delivery station so as to cause pivotal movement of the grid from the vertical orientation to the horizontal orientation.

12. Apparatus for transporting battery plate grids which include a pair of spaced lugs, which are transported from a vertical orientation in a magazine, and which are pivoted to a horizontal orientation for delivery from said apparatus, said apparatus comprising a frame including a pair of laterally spaced flat rails for respectively supporting the spaced grid lugs for movement of the grid lugs along said rails from a pick-up station adjacent the magazine, through a transfer station, and to a delivery station, a pair of suction cups, means on said frame for supporting said suction cups for movement of said suction cups parallel to said rails and from a first position wherein said suction cups engage the grid lugs at said pick-up station to a second position spaced from said first position and wherein the grid lugs are located at said transfer station, for movement of said suction cups transversely to said rails from said second position to a third position, and thereafter for return movement of said suction cups to said first position, means engageable with the grid lugs for stripping the grid lugs from said suction cups in response to movement of said suction cups from said second position to said third position, means connected to said suction cups for applying suction at said suction cups during movement of said suction cups from said first position to said second position so as to retain the grid lugs in engaged relation with said suction cups and so as thereby to transport the grids in common with movement of said suction cups from said pick-up station to said transfer station, conveyor means on said frame for engaging the grid lugs at said transfer station and for transporting the grids along said rails to said delivery station, and means on said frame for engaging the grids during movement thereof along said rails from said pick-up station to said delivery station so as to cause pivotal movement of the grids from the vertical orientation to the horizontal orientation.

13. Apparatus in accordance with claim 12 and further including means engageable with the grid lugs for stripping the grid lugs from said suction cups in response to movement of said suction cups from said second position to said third position.

14. Apparatus in accordance with claim 12 wherein the grids are in a vertical orientation in the magazine and further including means on said frame for engaging the grids during movement thereof along said rails from said pick-up station to said delivery station so as to cause pivotal movement of the grids from the vertical orientation to the horizontal orientation.

15. Apparatus in accordance with claim 12 wherein said suction cup supporting means comprises support rods respectively extending in parallel relation to said rails, respective support blocks movable along said rods, means for reciprocating said support blocks along said rods, respective members supporting said suction cups and carried by said support blocks for movement in common with said support blocks and for movement transversely of said support rods, and means for displacing said support members transversely of said support rods in response to movement of said support blocks beyond said second position.

16. Apparatus in accordance with claim 15 wherein said means for reciprocating said support blocks comprises respective levers pivotally mounted on said frame about respective axes extending transversely of said rails, means for oscillating said levers, and means connected said levers and said support blocks for displacing said support blocks along said support rods in response to oscillation of said levers.

17. Apparatus in accordance with claim 15 wherein said means for displacing said support members includes means biasing said support members for travel toward said rails, and means for displacing said support members away from said rails and against the action of said biasing means in response to movement of said support blocks on said support rods.

18. Apparatus in accordance with claim 17 wherein said means displacing said support members away from said rails comprises respective stationary cam surfaces on said frame, respective bell crank levers pivotally mounted on said support blocks for movement in common therewith and including respective first arms engagable with said cam surfaces in response to support block movement, and respective second arms, and means respectively and operatively connecting said second arms and said support members for displacing said support members away from said rails in response to pivotal movement of said bell crank levers incident to engagement between said cam surfaces and said first arms during movement of said support blocks along said support rods.

19. Apparatus in accordance with claim 12 and further including drive means operable to displace said suction cups, and means for discontinuing driving operation of said drive means in the event more than a single grid is transported at one time by said apparatus.

20. Apparatus in accordance with claim 19 wherein said conveyor means includes a pair of laterally spaced endless members, each endless member including a series of lugs in laterally aligned relation, and means for discontinuing driving operation of said drive means in the absence of a grid transported by each pair of laterally aligned drive lugs on said conveyor means.

21. Apparatus for transporting battery plate grids which include a lug, and which are transported from a magazine for delivery from said apparatus, said apparatus comprising a frame including a horizontally extending rail supporting a grid lug for horizontal movement of the grid lug along said rail from a pick-up station adjacent the magazine, through and to a second station spaced from said first station, a suction cup, means on said frame for supporting said suction cup for horizontal movement of said suction cup parallel to said rail and from a first position wherein said suction cup engages the grid lug at said pick-up station and to a second position spaced from said first position, for movement of said suction cup transversely to said rail from said second position to a third position, and thereafter for return movement of said suction cup to said first position, and means connected to said suction cup for applying suction at said suction cup during movement of said suction cup from said first position to said second position so as to retain the grid lug in engaged relation with said suction cup and so as thereby to transport the grid along said rail in common with movement of said suction cup from said pick-up station to said second station.

* * * * *